United States Patent [19]

Rung et al.

[11] Patent Number: 5,246,256

[45] Date of Patent: Sep. 21, 1993

[54] ROLL GROOVED PIPE

[75] Inventors: Robert Rung, Hopatcong; Douglas R. Dole, Whitehouse Station, both of N.J.

[73] Assignee: Victaulic Company of America, Easton, Pa.

[21] Appl. No.: 861,586

[22] Filed: Apr. 1, 1992

Related U.S. Application Data

[63] Continuation-in-part of Ser. No. 810,520, Dec. 19, 1991, Pat. No. 5,180,193.

[51] Int. Cl.$^5$ .................................... F16L 55/04
[52] U.S. Cl. .......................... 285/55; 285/112; 285/382.2; 285/424; 138/109; 72/105
[58] Field of Search ............. 285/55, 112, 373, 382.2, 285/424, 420; 138/109; 72/105

[56] References Cited

U.S. PATENT DOCUMENTS

| | | | |
|---|---|---|---|
| 2,821,415 | 1/1958 | Race, Jr. ........................ 285/373 X |
| 3,015,502 | 1/1962 | Frost et al. ........................ 285/112 |
| 3,253,841 | 5/1966 | Ahmad ........................ 285/55 |
| 3,381,353 | 5/1968 | Lemmerz ........................ 72/105 X |
| 3,528,689 | 9/1970 | Roe ........................ 285/382.2 |
| 3,606,659 | 9/1971 | Robbins ........................ 285/55 X |
| 3,995,466 | 12/1976 | Kunsman ........................ 72/105 X |
| 4,064,619 | 12/1977 | Echols et al. ........................ 285/55 X |
| 4,445,533 | 5/1984 | DeFrees ........................ 285/112 X |
| 4,598,937 | 7/1986 | Sugao ........................ 285/55 |
| 5,007,667 | 4/1991 | Unewisse et al. ........................ 285/382.2 |

FOREIGN PATENT DOCUMENTS

| | | | |
|---|---|---|---|
| 0678400 | 1/1964 | Canada ........................ 285/55 |
| 2051113 | 4/1942 | Fed. Rep. of Germany ........ 285/55 |
| 0367670 | 4/1963 | Switzerland ........................ 285/55 |

Primary Examiner—Randolph A. Reese
Assistant Examiner—Heather Chun
Attorney, Agent, or Firm—Abelman, Frayne & Schwab

[57] ABSTRACT

A roll grooved pipe is provided on its inner surface with a hydrofoil surface providing a transition between the inner surface of the pipe and the radially innermost portion of a radially inwardly extending step formed in the inner wall of the pipe by the cold rolling of the groove in the pipe.

7 Claims, 5 Drawing Sheets

5,246,256

ROLL GROOVED PIPE

This application is a continuation in part of U.S. patent application Ser. No. 810,520 filed Dec. 19, 1991 now U.S. Pat. No. 5,180,193.

FIELD OF THE INVENTION

This invention relates to roll-grooved pipe, such as is commonly employed in conjunction with segmented pipe couplings to assemble a pipe line system.

BACKGROUND OF THE INVENTION

The roll grooving of metal pipe, and the use of such roll-grooved pipe in conjunction with segmented pipe couplings is well-known in the art.

Roll-grooving was developed to enable the use of segmented pipe couplings on lightwall pipe which has too thin a wall thickness for it to be "cut grooved". Roll grooved lightwall pipe, is often less expensive than standard weight cut grooved pipe, particularly when using stainless steel.

The rolled groove profile originally developed was similar to the familiar cut groove of the day. It was essentially a square groove with some necessary minor profile modifications added to maintain adequate joint strength. These modifications included radiused corners at the bottom of the groove for reasons of pipe strength and formability, and a slightly narrower width to reduce angular deflection of the joint for joint strength.

Grooves of this profile have served the general industry well for some 35 plus years and will continue to do so.

A typical segmented pipe coupling is those disclosed in U.S. Pat. No. 4,611,839 Rung et al. issued Sep. 16, 1986. Also, typical of an apparatus for use in the roll-grooving of pipe is the one disclosed in U.S. Pat. No. 3,995,466, Kunsman, issued Dec. 7, 1976.

In the roll-grooving of metal pipe, the pipe is supported on rollers, and a groove forming tool is affixed to one end of the pipe on a radius thereof. The groove-forming tool has complementary power driven mutually presented groove-forming rollers that are forced towards each other, and which, in the process, impinge on the inner and outer circumferences of the pipe at the said radius. The driven rolls then progressively deform the pipe under cold working to provide a continuous circumferential groove in the outer circumference of the pipe, the groove being suitably configured to accommodate the keys of a segmented pipe coupling. During this groove-forming operation, the pipe rotates on its supporting rollers, the groove-forming rollers being held in fixed axial position by a supporting frame. Alternatively, the pipe can be held fixed, and the groove forming rollers be caused to orbit the pipe end.

Prior to the present invention, the rolled groove has been essentially rectangular in transverse cross-section, for the groove to provide an axially extending bottom wall flanked by mutually presented radially extending side walls that extend essentially perpendicular to the pipe axis.

The rolling of the groove requires that the material of the pipe wall in the location of the groove, be displaced radially inwardly of the pipe. This results in the formation of a step in the bore of the pipe. That step, under hydrodynamic or aerodynamic conditions produces eddy currents and turbulence in the conveyed fluid. While this generally results in negligible pressure loss, under severe conditions of high velocity or abrasive flowing media, it can cause increased wear at the step in the joint and immediately downstream thereof.

SUMMARY OF THE INVENTION

It is an object of this invention to minimize such eddy currents and turbulences, and thus minimize both wear and pressure losses during operation of a pipe line formed of roll-grooved pipe.

According to the present invention, that radial wall of the groove that is remote from the associated pipe end is displaced from its normal orientation of extending perpendicular to the pipe axis, to a position in which it converges towards the pipe axis in a direction towards the associated end of the pipe, that radial wall of the groove then being in the form of a frustum of a cone having its apex positioned on the pipe axis at a position spaced beyond the associated end of the pipe, and having its base concentric with the pipe axis and spaced inwardly of the associated end of the pipe.

The formation of that wall of the groove in that manner results in turn in the formation of an axially extending hydrofoil on the inner wall of the pipe that is operative to suppress the formation of eddy currents and turbulences in the conveyed fluid.

The grove profile of the present invention maintains adequate joint strength, yet results in less pressure drop and pipe abrasion than with the prior art. This is accomplished by a change to the rear edge of the groove wherein the pipe wall is displaced radially inward in this area, resulting in a tapered transition on the inside surface of the pipe. This tapered portion produces a less abrupt flow path for the piped media than does the prior art, produces less pressure drop and less abrasion of the displaced pipe wall.

The roller dies used to produce this profile are different with respect to working surface geometry than those of the prior art. The prior art roller dies working surfaces are generally symmetrical abut the groove centerline, producing a symmetrically shaped groove. The working surfaces of the roller dies used to produce the enhanced flow profile groove of the present invention have a non-symmetrical geometry about the groove centerline. The working surfaces of the roller dies are those surfaces that contact the pipe inside surface or outside surface during the roll groove forming process.

The fluids to be conveyed are in liquid or gaseous form. In both instances, the pressure loss incurred in the conveyance of such fluids is reduced. In the event that the fluid is a slurry or suspension of particulate matter in a gas, then, a highly desirable additional benefit accrues. By forming the pipe in accordance with the present invention, the attrition rate of the pipe at the joint is greatly reduced, this in turn resulting in a prolongation of the useful life of the piping system.

The elimination of one of the radial walls of the groove is of no consequence when employing a segmented pipe coupling of the type disclosed in U.S. Pat. No. 4,611,839, in that such a segmented pipe coupling does not rely exclusively on the reaction of its keys against the opposite radial walls of the grooves in order to provide the rigid coupling taught by that patent. Further, and as will appear, the benefits of the invention can be provided without totally eliminating one of the radial walls of the groove. A portion of that radial wall can remain, thus providing a reaction member for the keys of the associated pipe coupling, while at the same time, the required annular hydrofoil on the inner circumference of the pipe is formed entirely in the intended manner. Thus, by this modification, the roll-grooved pipe is usable with any form of segmented pipe coupling, including the one of U.S. Pat. No. 4,611,839, while at the same time preserving the benefits of the present invention in the reduction of eddy currents and turbulences, and, the pressure losses incumbent thereon.

While the invention finds application in unlined metal pipe, it also finds application in lined metal pipe, as will appear from the following discussion.

Eddy currents and turbulences in the conveyed fluid can be further suppressed by providing an annular filler element that extends between the end of the pipe and the adjacent inner wall of the rolled groove, again as is later discussed in this application.

DESCRIPTION OF THE DRAWINGS

The invention will now be described with reference to the accompanying drawings, in which.

DESCRIPTION OF THE PRIOR ART

Figure 1:
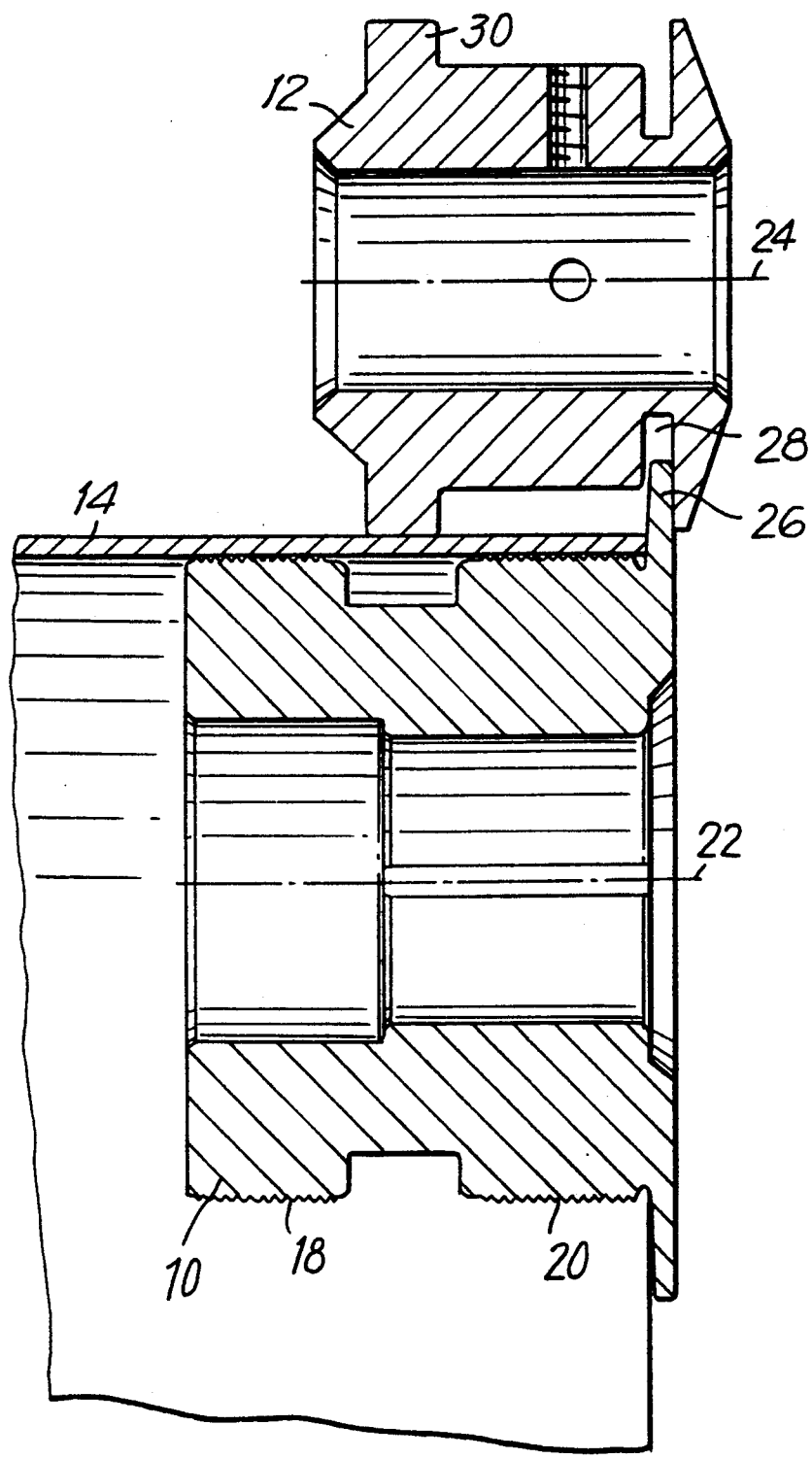
FIG. 1 is a longitudinal cross-section through prior art forming rolls, and their positioning at the commencement of a groove rolling operation.

Referring firstly to FIG. 1, a female rolling die is indicated at 10, and, a complementary male rolling die is indicated at 12. A fragment of thin walled pipe is indicated at 14, the thin walled pipe being interposed between the female rolling die 10 and the male rolling die 12.

The female-rolling die has a circumferential groove 16, which is flanked on its opposite sides by cylindrical lands 18 and 20 which, as is common in the art, are coarsely knurled in order to improve the grip on the inner wall of the thin-walled pipe 14, the female die 10 being the one which is power-driven, there also being circumstances in which the male-rolling die also is power-driven at a peripheral speed corresponding with that of the peripheral speed of the female rolling die.

The female rolling die is journaled for rotation on an axis 22 by a journal member [not shown], and, the male rolling die 12 is journaled for rotation on an axis 24 by a journal member [not shown]. To ensure axial alignment between the respective rolling dies, the female rolling die is provided with a radial flange 26, which is received within a radial groove 28 in the male rolling die 12.

The male rolling die has a peripheral annular die member 30 that is positioned in axial alignment with the center of the groove 16 in the female rolling die, and which, upon relative movement of the axes 22 and 24 towards each other is displaced inwardly of the groove 16 in interfitting relationship therewith.

Figure 2:
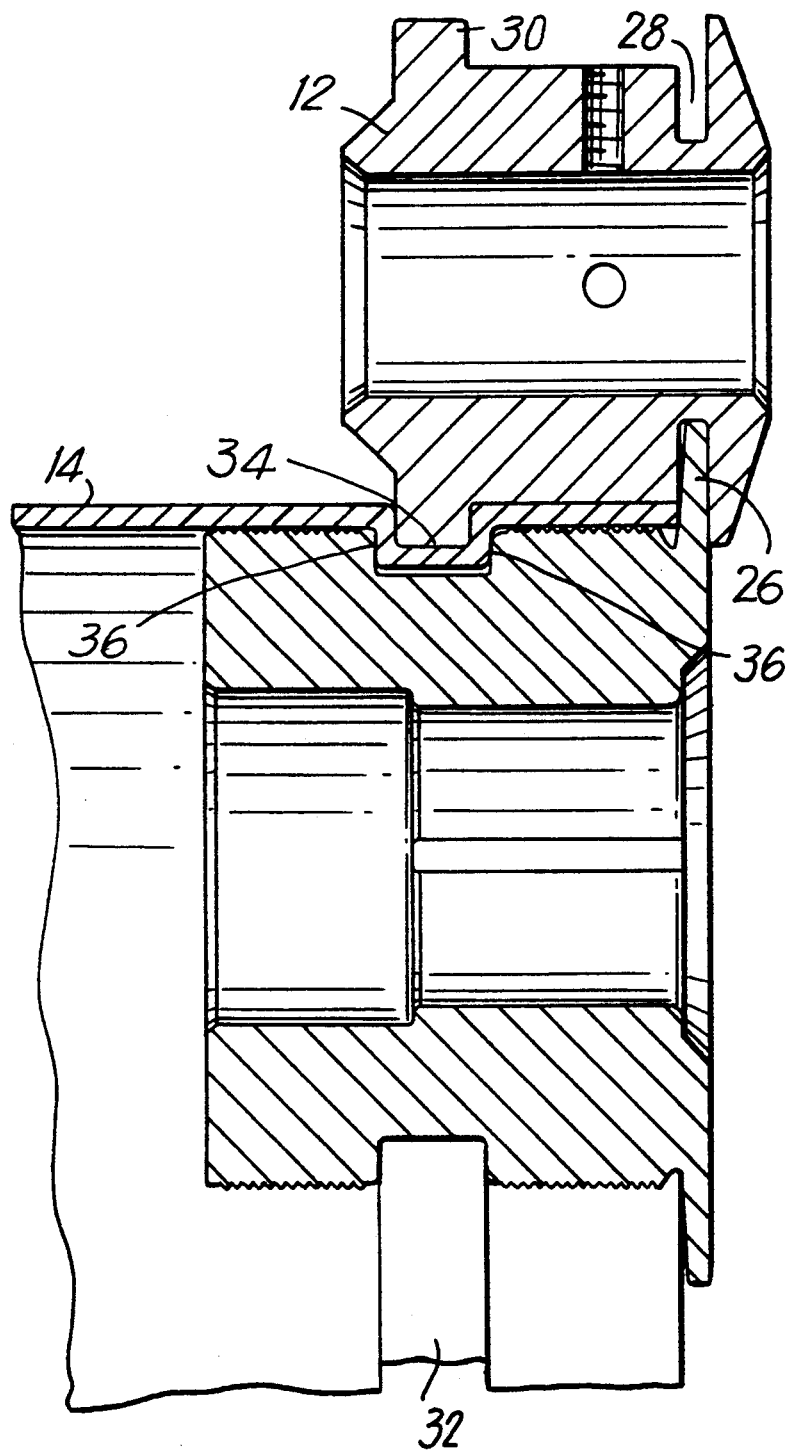
FIG. 2, which is also prior art, corresponds with FIG. 1 and shows the grooving rolls in the position they occupy at the termination of a rolling operation.

As is well known in the art, upon rotation of the female rolling die 10 and relative movement of the rolling dies 10 and 12 towards each other, the thin walled pipe becomes supported in line engagement on the lands 18 and 20 of the female rolling die 10, and the annular die member 30 progressively imposes a radial force on the pipe 14, which acts to cold work the pipe in the vicinity of the annular die member 30, and, progressively displace the juxtaposed wall portion of the thin walled pipe into the groove 16 in the female rolling die 10, as illustrated in FIG. 2, thus forming a continuous groove extending peripherally of the thin walled pipe 14, the pipe 14 during that forming process rotating about the longitudinal axis of the thin walled pipe. The groove formed in the thin walled pipe 14 is indicated at 32 in FIG. 2.

Thus, by the prior art rolling process, a continuous groove is roll formed in the thin walled pipe 14, that groove having a substantially axially extending bottom wall 34, and substantially radially extending side walls 36, thus to simulate a conventional cut grooved pipe, while at the same time eliminating the cost of machining a cut groove, and, permitting the use of thin walled pipe.

As has been previously states, the technique discussed above with reference to FIGS. 1 and 2 has long been performed in the art, and, has proved to be entirely successful in those circumstances in which thin walled pipe is to be employed.

The rolling process, however, carries with it a disadvantage, in that the groove 32 then provides a step in the internal diameter of the pipe, which, in addition to reducing the effective cross-sectional area of the pipe at the step, also carries with it the disadvantage of causing an abrupt change in the flow path of the transmitted fluid, which can result in pressure losses in the transmission of the fluid, especially when the fluid is traveling at relatively high velocity.

While it is impossible to overcome the disadvantage of the reduction in the cross-sectional area of the pipe at the step, by following the teachings of the present invention, the other disadvantage of pressure losses caused by eddy currents at the step can be eliminated substantially in its entirety.

DESCRIPTION OF THE PREFERRED EMBODIMENTS

The invention will now be described with reference to FIGS. 3 and 4, which illustrate rolling dies according to the present invention, and, the modification in the cross-sectional profile of the roll groove pipe by employing the rolling dies according to the present invention. Similar elements to those in FIGS. 1 and 2 have been identified by the same references numerals as those employed in FIGS. 1 and 2.

Figure 3:
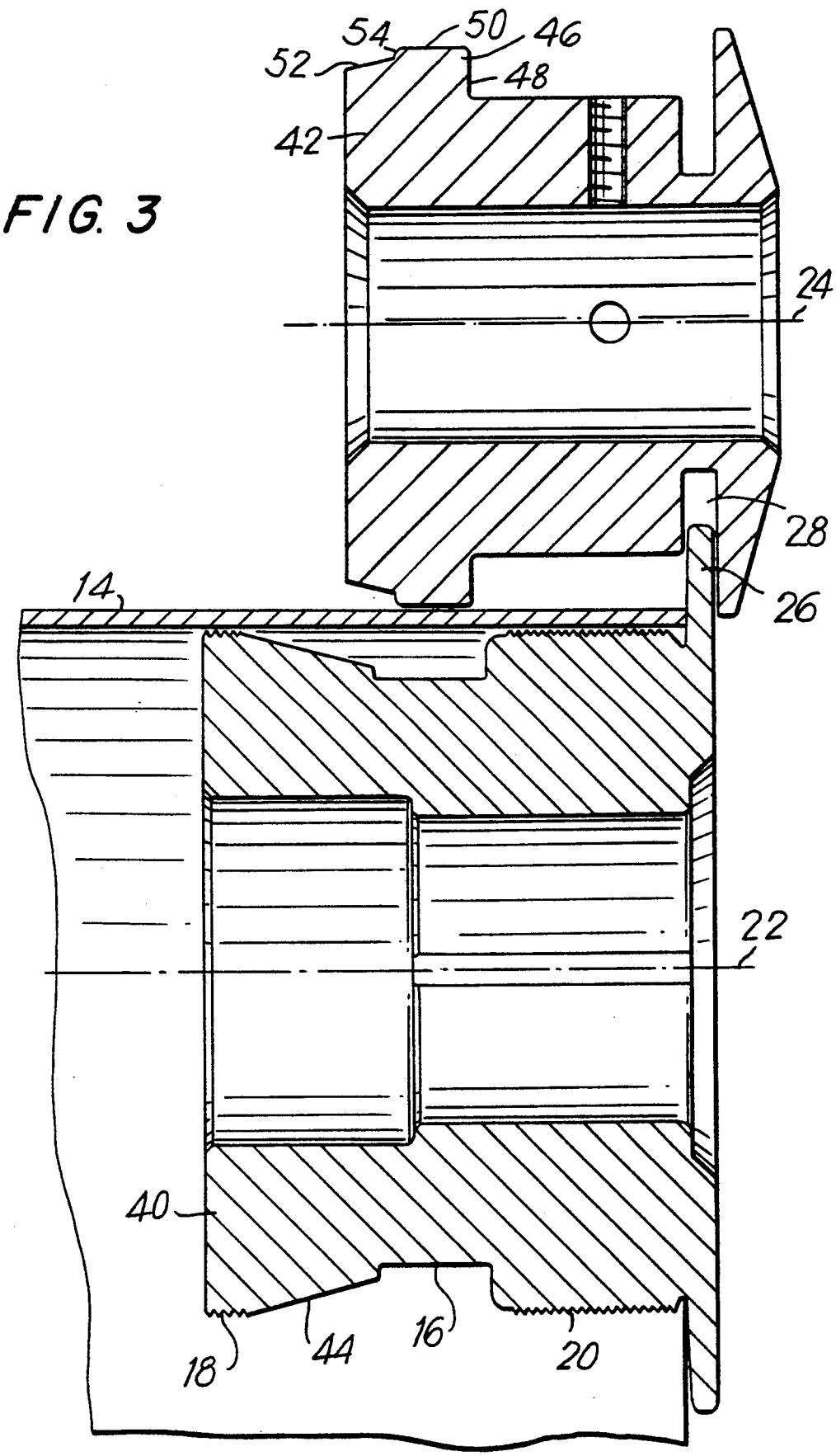
FIG. 3 is a longitudinal cross-section of the rolls of the present invention, and which are shown in the position they occupy prior to a groove rolling operation.

Referring now to FIG. 3, the female rolling die of the present invention is indicated at 40, and, the male rolling die is indicated at 42. As in the known embodiments, the female rolling die 40 is provided with a radial flange 26, which interfits in a radial groove 28 in the male rolling die 42. The respective rolling dies 40 and 42 are rotatable about axes 22 and 24, the rolling dies being supported on journals [not shown] which are movable towards one another in the same manner as that discussed with respect to the prior art.

The female rolling die 40 includes a circumferential groove 16, and also includes the cylindrical lands 18 and 20 of the prior art, but, in a different configuration to that of the prior art, the land 18 having been very considerably shortened, in order to accommodate a frusto-conical surface 44 that is interposed between the land 18 and the adjacent side wall of the groove 16, this leaving only a minuscule portion of that side wall in existence in the female rolling die 40. The surfaces 16 and 44 are in fact not critical in shape. The inside wall of the pipe does not contact them during the rolling operation but remains spaced therefrom with clearance. The significance of this structure is discussed later in the specification.

As in the prior art, the remaining portion of the land 18, and the land 20, each are coarsely knurled on their outer surfaces to enhance the gripping and driving traction on the thin walled pipe 14.

The male rolling die 42, and in particular, the annular die member 46 is of different configuration to that known from the prior art. The annular die member 46 includes a radial wall 48 that faces towards the adjacent end of the pipe, and includes an axial wall 50 that corresponds in general with the axial wall of the prior art annular die member 30.

The male rolling die 42 is devoid of a radial wall that faces oppositely to the adjacent end of the pipe, that wall having been replaced by a frusto-conical extension 52 arranged at an angle matching to that of the frusto-conical portion 44 of the female rolling die 40. Again, and as is discussed later, the wall portions 50 and 52 can be interconnected by a radiused transitional portion 54.

Figure 4:
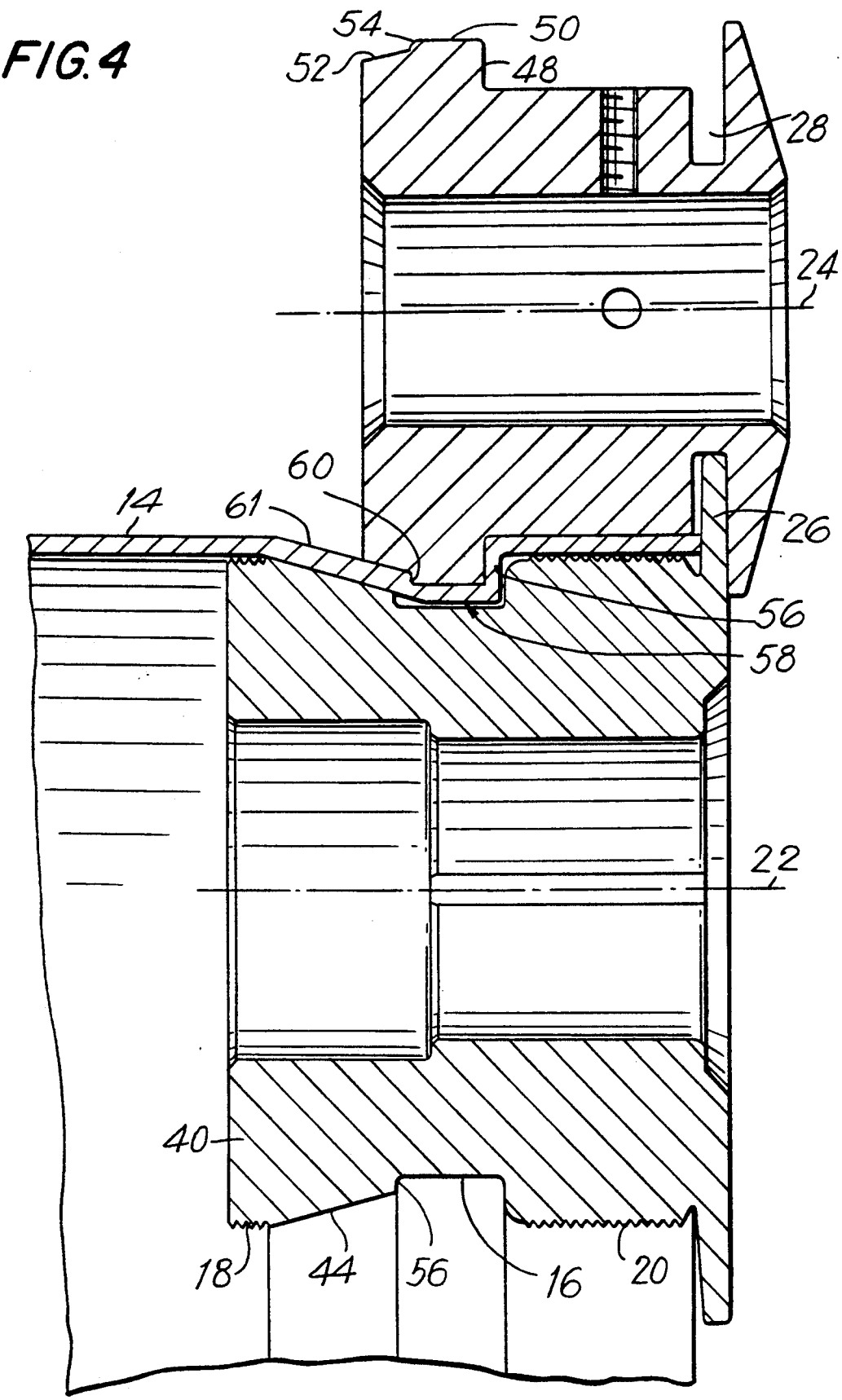
FIG. 4 is a view corresponding with FIG. 3, and which shows the rolls in the position they occupy at the termination of a rolling operation.

FIG. 3 shows the rolling dies in position prior to a rolling operation, FIG. 4 showing the position of the rolling dies and the configuration of the pipe 14 upon completion of the rolling operation.

On commencement of the rolling operation, the annular die member 50 progressively depresses the juxtaposed wall of the pipe, and, in so doing forms one side wall 56 of the rolled groove and the bottom wall 58. The opposite side wall 36 of the prior art groove is non existent, with the exception of an extremely minor step 60 that is formed at the position of that side wall, the minor step 60 being sufficient to provide a reaction member for the coupling keys when employing a coupling of the type disclosed in U.S. Pat. No. 4,611,839.

Proceeding from that point, the pipe proceeds in the form of a frustum of a cone 62 having its apex positioned on the center line of the pipe at a position spaced beyond the adjacent end of the pipe, and its base extending perpendicular to the pipe axis, thus to provide an inwardly convergent hydrofoil or aerofoil in the immediate vicinity of the rolled groove, and, which merges through a smooth transition into the inner surface of the bottom wall 58 of the groove. The formation of the hydrofoil thus occurs under a stretching and a rolling operation that provides a surface devoid of any stepping that would be available to promote the formation of eddy currents, and which would in turn, promote pressure losses in the conveyed fluid.

The conical surface 62 is not necessarily straight conical. In practice, it assumes a slightly curved conical shape that provides a smooth transition between the respective diameters of the pipe.

It is commented that, as in the prior art, the annular die member 30 or 50 of the male rolling die and the groove of the female rolling die 10 or 40 are so proportioned that upon completion of the groove-rolling operation, the inner surface of the pipe 14 at the bottom wall of the groove, 36 or 58, is spaced from the bottom wall of the groove 16. Thus, the minor step 56 that is present adjacent the frusto-conical surface has little or no effect in the formation of a step on the inner surface of the pipe. The pipe merely extends clear of the step 56, and then extends in a smooth transition to the interior surface 58 of the bottom wall of the groove.

Thus, a configuration of rolled groove in thin-walled pipe is provided, in which the formation of eddy currents is suppressed to the maximum possible extent, and this, without impairing in any way the functionality of the roll grooved pipe in its use in conjunction with a segmented pipe coupling. The problem of pressure loss arising from the reduced cross-sectional are of the pipe at the location of the rolled groove cannot, of course, be eliminated. However, the reduction of the downstream eddy currents and the gradual rise in pressure of the fluid as it passes the rolled groove 58, again acts to further minimize pressure losses in the piping system, the change in pressure and velocity of the conveyed fluid being at a gradual rate, as opposed to an almost instantaneous rate, as in the prior art constructions.

Figure 5:
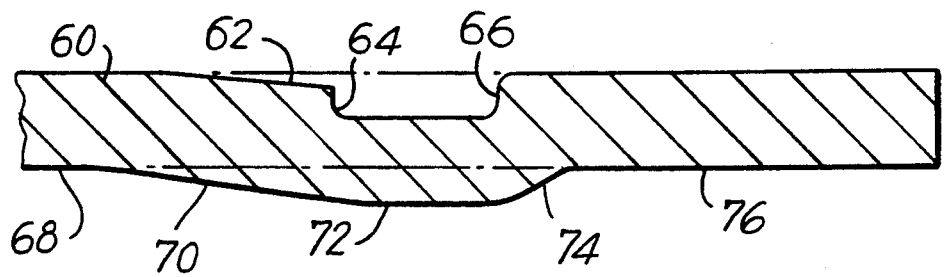
FIGS. 5, 6 and 7 are fragmentary cross-sections showing the roll grooved pipe of the present invention, together with additions that can be made to the roll grooved pipe.

Referring now to FIG. 5, there is shown a groove configuration that can be formed in relatively massive, but still thin walled pipe as compared with conventional pipe employed when employing the prior art cut grooving technique.

In FIG. 5, the pipe 60 is roll grooved to provide a gently inwardly converging frusto-conical surface 62, which continues up to a side wall 64 of the groove, that side wall being of considerably less radial extent than the opposite side wall 66 of the groove, the side wall 64 having a height less than that of side wall 66 thus providing an abutment surface for the keys of a segmented pipe coupling, the inner surface of the pipe 60 proceeding from an axially straight surface 68 of maximum diameter, then continuing into a frusto-conical surface 70 that is devoid of steps or sharp edges, the frusto-conical surface 70 then merging into the substantially axially straight inner wall 72 of the pipe at the pipe groove, subsequent to which, the inner surface diverges outwardly at 74, and then continues into an axially straight inner wall portion 76.

Figure 6:
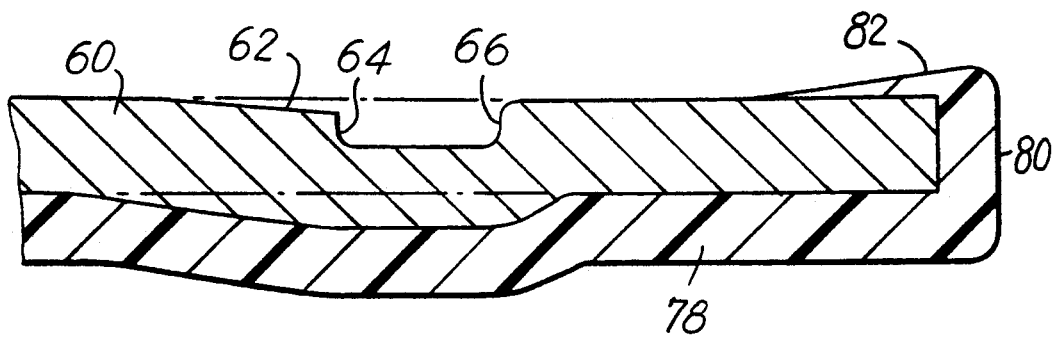
Figure 7:
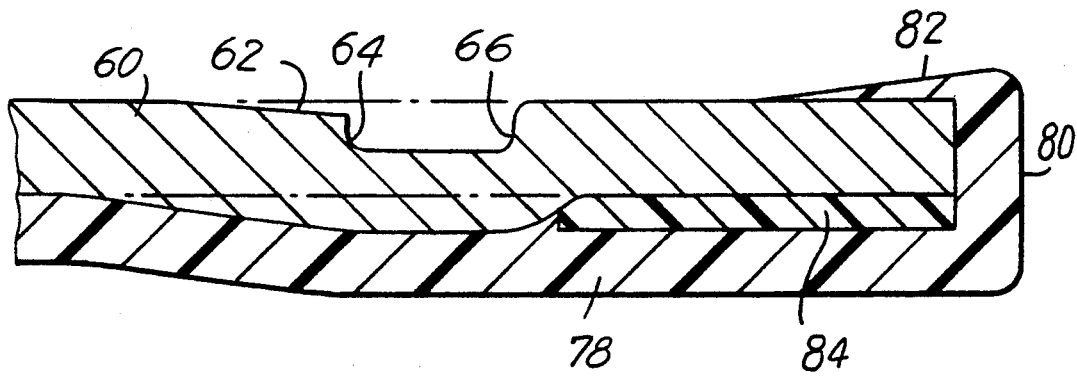

FIG. 6 illustrates the employment of the grooved pipe of FIG. 5 in the configuration of lined pipe of the type commonly used for conveying acidic or caustic chemicals, slurries, and, suspensions of particulate material in a gas. In FIG. 6, the pipe 65 is provided with an internal lining 78 of a rubber-like elastomer, the lining 80 then proceeding radially outwardly across the end face of the pipe, and then extending reversely on the exterior surface of the pipe in a taper 82. By so forming the lining in this manner, interfitment of pipes with segmented pipe couplings, as taught in co-pending U.S. patent application Ser. No. 810,520 is promoted.

Also, as is taught by co-pending U.S. patent application Ser. No. 810,520, the suppression of eddy currents and abrupt pressure changes at a position downstream of the rolled groove can be further suppressed by the insertion of an annular liner 84 into the end of the pipe prior to the lining of the pipe, thus further minimizing the pressure losses in the assembled piping system.

What we claim is:

1. Roll grooved pipe having an outer surface, an inner surface, and a cold rolled groove formed in said outer surface, said pipe having a configuration, when viewed in longitudinal cross-section, comprised by:
    a radially extending end wall of said pipe;
    outer and inner wall portions extending from said end wall and terminating at said rolled groove;

said rolled groove having a profile which includes a first outer radially extending wall portion terminating at said outer wall portion and extending radially inwardly of said pipe;

an axially extending wall portion terminating at an inner periphery of said radially extending wall portion; and, a second radially extending wall terminating at said axially extending wall and having a height less than that of said first radially extending wall;

an outer frusto-conical wall portion terminating at said second radially extending wall portion, and extending axially of said pipe in divergent relationship relative to a central axis of said pipe;

said inner wall having a profile that includes an inner radially inwardly extending wall portion terminating at said inner wall portion;

an axially extending inner wall portion terminating at an inner periphery of said radially inwardly extending wall portion and extending axially of said pipe; and, a straight sided frusto-conical wall portion commencing at said axially extending inner wall portion and extending axially of said pipe in divergent relationship relative to said central axis of said pipe to a termination of said straight sided frusto-conical wall portion at said inner surface of said pipe;

said inner frusto-conical wall portion providing a smooth and uninterrupted linear transition between said inner surface of said pipe and said inner axially extending wall portion of said groove.

2. Roll grooved pipe according to claim 1, in which said first radially extending outer wall extends substantially perpendicular to said longitudinal axis of said pipe.

3. Roll grooved pipe according to claim 1, in which said frusto-conical wall portions lie on the surface of imaginary cones having their respective axes coaxial with said longitudinal axis of said pipe, the apex of said imaginary cones being positioned spaced from and axially beyond said radially extending end wall of said pipe.

4. Roll grooved pipe according to claim 1, including a lining of an elastomer applied to said inner surface of said pipe and extending over said end surface, said lining terminating on said outer surface of said pipe in a portion extending axially of said pipe and which progressively decreases to zero thickness in a direction spaced axially from said end wall.

5. Roll grooved pipe according to claim 4, including a filler member inserted into said pipe and prior to the application of said lining to said pipe interior, said filler member having a thickness which is substantially the same as the radially inward extent of said inner radially inwardly extending portion.

6. Roll grooved pipe of claim 1, in which said rolled groove is formed by male and female grooving rollers engaged respectively with said outer surface of said pipe and said inner surface of said pipe, said male grooving roll having an axial profile complementary to that of said profile on said outer surface on said pipe, and said female grooving roll having an axial profile complementary to that of said profile on said inner surface of said pipe.

7. Roll grooved pipe having an internal radially inwardly extending step formed on an inner surface of said pipe, further including a frusto-conical surface portion on said pipe inner surface providing a transitional hydrofoil surface interconnecting the inner axial wall of said pipe and a radially innermost axially extending wall of said step.

* * * * *